T. P. RODGERS.
Belt Hole Covers.

No. 144,144.             Patented Oct. 28, 1873.

Witnesses.                                   Inventor.

T. P. Rodgers
Per
Attorneys.

UNITED STATES PATENT OFFICE.

TOPPAN P. RODGERS, OF TAUNTON, MASSACHUSETTS.

IMPROVEMENT IN BELT-HOLE COVERS.

Specification forming part of Letters Patent No. 144,144, dated October 28, 1873; application filed September 27, 1873.

*To all whom it may concern:*

Figure 1:
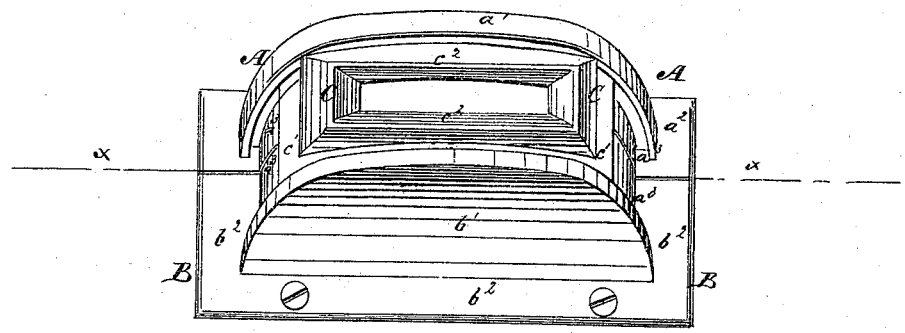
Figure 2:
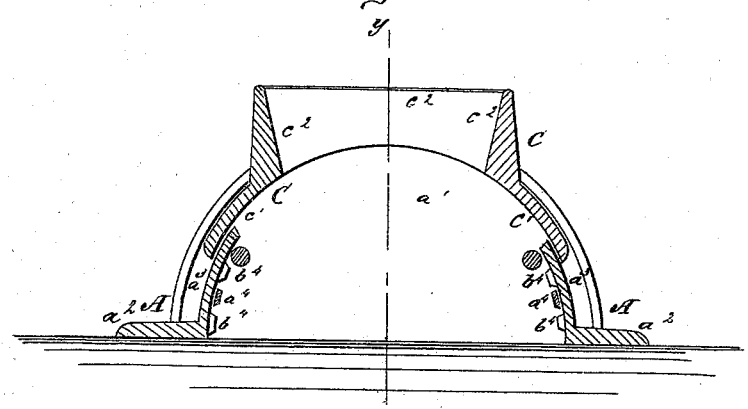
Figure 3:
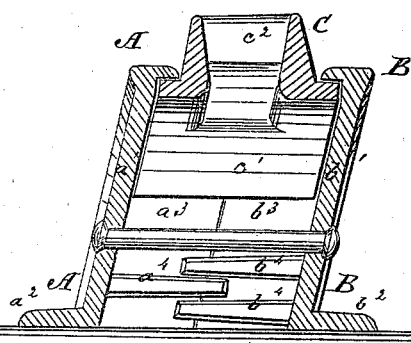

Be it known that I, TOPPAN P. RODGERS, of Taunton, in the county of Bristol and State of Massachusetts, have invented a new and useful Improvement in Belt-Hole Cover, of which the following is a specification:

Figure 1 is a top view of my improved belt-hole-cover. Fig. 2 is a longitudinal section of the same taken through the line $x\,x$, Fig. 1; and Fig. 3 is a cross-section of the same taken through the line $y\,y$, Fig. 3.

My invention has for its object to furnish an improved cover for belt-holes in floors, which shall be so formed as to prevent any rubbish that may be upon the floor from dropping upon the belt and pulley below the floor, and thus injuring said belt, and which will enable the floor to be flooded in washing it, and in case of fire, without any danger of the water flowing through the belt-hole to the floor beneath. The invention consists in an improved belt-hole cover, formed of the three parts constructed and arranged to operate in connection with each other, as hereinafter fully described.

The case, box, or stationary part of the cover is made in two parts, A B, which fit closely upon each other, and are secured together by bolts or rivets passing through the sides or upright plates $a^1\,b^1$ of said case. $a^2\,b^2$ are the bases or bottom plates of the case A B, and which are secured to the floor by screws or bolts. The upright plates $a^1\,b^1$ project upward vertically, or at any desired angle, according to the direction of the belt, and are made in the form of segments of circles. $a^3\,b^3$ are curved or arched flanges formed upon the lower part of the inner sides of the uprights $a^1\,b^1$, near their edges. The inner edges of the curved or arched flanges $a^3\,b^3$ correspond with and fit upon each other, where they are secured in place by the projecting points $a^4\,b^4$, which interlock with each other, as shown in Figs. 2 and 3. C is the upper or movable part of the belt-cover, the base-plate $c^1$ of which is curved upon the arc of a circle to fit and slide upon the arched flanges $a^3\,b^3$ as a seat. The side edges of the curved base $c^1$ are kept in place by flanges formed upon the curved edges of the uprights $a^1\,b^1$. In the middle part of the base-plate $c^1$ is formed a hole of sufficient size for the belt to pass through freely, and which is surrounded by an inclined flange, $c^2$, making the opening hopper-shaped.

By this construction the belt can carry the upper part C of the cover with it in its lateral movements, and the said part C will stand in any position into which it may be moved, preventing the belt from being rubbed and chafed.

Having thus described my invention, I claim as new and desire to secure by Letters Patent—

An improved belt-hole cover, formed of the parts A $a^1\,a^2\,a^3\,a^4$, B $b^1\,b^2\,b^3\,b^4$, and C $c^1\,c^2$, said parts being combined to operate in connection with each other, substantially as herein shown and described.

TOPPAN P. RODGERS.

Witnesses:
   W. E. FULLER,
   M. L. SPROAT.